(12) United States Patent
Gabriel

(10) Patent No.: US 11,585,456 B2
(45) Date of Patent: Feb. 21, 2023

(54) VALVE ASSEMBLIES WITH INTEGRATED TEMPERATURE CONTROL

(71) Applicant: FISHER CONTROLS INTERNATIONAL LLC, Marshalltown, IA (US)

(72) Inventor: Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 145 days.

(21) Appl. No.: 16/241,633

(22) Filed: Jan. 7, 2019

(65) Prior Publication Data
US 2020/0217433 A1  Jul. 9, 2020

(51) Int. Cl.
*F16K 49/00* (2006.01)
*F16K 31/00* (2006.01)
(Continued)

(52) U.S. Cl.
CPC .............. *F16K 31/002* (2013.01); *F16K 1/42* (2013.01); *F16K 37/0091* (2013.01);
(Continued)

(58) Field of Classification Search
CPC . F16K 49/005; F16K 1/42; F16K 3/30; F16K 31/002; F16K 37/0091;
(Continued)

(56) References Cited

U.S. PATENT DOCUMENTS 2,074,091 A * 3/1937 MacKinnon .......... F16K 49/005
137/340
2,444,703 A * 7/1948 Jones ...................... F16K 41/10
137/340

(Continued)

FOREIGN PATENT DOCUMENTS

CN   202152864 U    2/2012
FR     2944333 A1   10/2010

OTHER PUBLICATIONS

International Search Report received for PCT/US2019/066155, dated Apr. 15, 2020.
(Continued)

*Primary Examiner* — Craig M Schneider
*Assistant Examiner* — Jonathan J Waddy
(74) *Attorney, Agent, or Firm* — Marshall, Gerstein & Borun LLP

(57) ABSTRACT

A valve control assembly includes a valve body having an inlet adapted to be coupled to a source of process fluid having a first temperature, an outlet, and a fluid flow path extending between the inlet and the outlet, and a bonnet coupled to the valve body. An inlet port, an outlet port, an annular plenum, an inlet passage, and an outlet passage are integrally formed in the valve body or the bonnet. The inlet port is adapted to be coupled to source of media and the annular plenum is disposed between the inlet port and the outlet port, immediately adjacent a portion of the fluid flow path. The inlet passage directs the media from the inlet port to the annular plenum, which changes a temperature of the process fluid flowing through the fluid flow path from the first temperature to a second temperature different from the first temperature.

20 Claims, 7 Drawing Sheets

(51) Int. Cl.
*F16K 1/42* (2006.01)
*F16K 37/00* (2006.01)
*F16K 3/30* (2006.01)

(52) U.S. Cl.
CPC .............. *F16K 49/005* (2013.01); *F16K 3/30* (2013.01); *Y10T 137/6579* (2015.04)

(58) Field of Classification Search
CPC ........ F16K 3/0209; F16K 47/00; F16K 47/08; F16K 49/00; Y10T 137/6416; Y10T 137/6579
USPC .................................................. 137/334, 340
See application file for complete search history.

(56) References Cited

U.S. PATENT DOCUMENTS

| | | | | |
|---|---|---|---|---|
| 2,823,696 A | * | 2/1958 | Detlefson | F16K 41/12 137/340 |
| 2,845,084 A | * | 7/1958 | Detlefson | F16K 41/12 137/340 |
| 3,916,941 A | * | 11/1975 | Usry | F16K 49/005 137/340 |
| 3,981,946 A | * | 9/1976 | Soya | F22G 5/126 261/118 |
| 4,207,919 A | * | 6/1980 | Hutton | F16K 47/08 137/599.05 |
| 4,366,833 A | * | 1/1983 | Grotloh | F22G 5/126 137/334 |
| 6,116,267 A | * | 9/2000 | Suzuki | F16K 41/10 137/340 |
| 2006/0048513 A1 | * | 3/2006 | Fukuda | F16K 49/005 60/645 |
| 2006/0207666 A1 | | 9/2006 | Micheel et al. | |
| 2013/0199628 A1 | * | 8/2013 | Schiestl | F16K 49/005 137/340 |
| 2017/0299088 A1 | | 10/2017 | Rau et al. | |
| 2018/0259270 A1 | | 9/2018 | Dixon et al. | |

OTHER PUBLICATIONS

Written Opinion received for PCT/US2019/066155, dated Apr. 15, 2020.

* cited by examiner

| Water Temperature/Vapor Pressure ||||
|---|---|---|---|
| Temperature || Vapour Pressure ||
| °C | °F | kN/m² | lb/in² |
| 50 | 122 | 12.50 | 1.81 |
| 55 | 131 | 15.70 | 2.28 |
| 60 | 140 | 20.00 | 2.90 |
| 65 | 149 | 25.00 | 3.63 |
| 70 | 158 | 32.10 | 4.66 |
| 75 | 167 | 38.60 | 5.60 |
| 80 | 176 | 47.50 | 6.88 |
| 85 | 185 | 57.80 | 8.38 |
| 90 | 194 | 70.00 | 10.15 |
| 95 | 203 | 84.50 | 12.26 |
| 100 | 212 | 101.33 | 14.70 |

FIG. 6

VALVE ASSEMBLIES WITH INTEGRATED TEMPERATURE CONTROL

FIELD OF THE DISCLOSURE

The present disclosure generally relates to fluid pressure reduction devices, and, more particularly, to a method of manufacturing a valve assembly with integrated temperature control that more efficiently and effectively reduces, if not prevents, cavitation and solidification during fluid pressure reduction of process fluid flowing through the valve assembly.

BACKGROUND

In process control systems, such as distributed or scalable process control systems commonly found in chemical, petroleum, power generation, or other industrial processes, it is often necessary to reduce the pressure of a fluid. However, pressure reduction may lead to cavitation in the fluid or solidification when the fluid is a viscous fluid. Thus, process control systems often employ flow reduction devices that aim to reduce fluid pressure in a manner that does not lead to cavitation or solidification.

However, known flow reduction devices that attempt to prevent cavitation or solidification are manufactured using time consuming and expensive fabrication processes. For example, FIG. 1 illustrates a known flow reduction device in the form of a valve for reducing or eliminating solidification in applications using high viscosity polymers. The valve of FIG. 1 is manufactured by block forging a body, drilling multiple passages into the sides of the body, and then plugging certain drilled passages to produce a single inlet and outlet. FIGS. 2 and 3 illustrate a device, commonly referred to as a Mueller® plate, that can be fabricated on an exterior surface of a valve for reducing or eliminating solidification. The Mueller® plate has "dimples" pressed into a piece of sheet metal that create passageways for media to travel through and either cool or heat a process fluid flowing through the valve.

SUMMARY

In accordance with a first exemplary aspect of the present disclosure, a valve control assembly for use in a fluid flow control device is disclosed. The valve control assembly includes a valve body, a bonnet coupled to the valve body, an inlet port, an outlet port, an annular plenum, an inlet passage, and an outlet passage. The valve body defines an inlet, an outlet, and a fluid flow path extending between the inlet and the outlet. The inlet is adapted to be coupled to a source of process fluid, which has a first temperature. The inlet port and the outlet port are integrally formed in the valve body or the bonnet, and the inlet port is adapted to be coupled to a source of media. The media has a control temperature that is different from the first temperature of the process fluid. The annular plenum is integrally formed in the vale body or the bonnet between the inlet port and the outlet port, and is positioned immediately adjacent a portion of the fluid flow path. The inlet passage is integrally formed in the valve body or the bonnet and directs the media from the inlet port to the annular plenum, such that the annular plenum changes a temperature of the process fluid flowing through the portion of the fluid flow path from the first temperature to a second temperature that is different from the first temperature. The outlet passage is also integrally formed in the valve body or the bonnet and directs the media from the annular plenum to the outlet port.

In accordance with a second exemplary aspect of the present disclosure, a valve control assembly for use in a fluid flow control device is disclosed. The valve control assembly includes a valve body defining an inlet, an outlet, and a fluid flow path extending between the inlet and the outlet, and a bonnet coupled to the valve body. The inlet is adapted to be coupled to a source of process fluid having a first temperature. The valve control assembly also includes a means for changing a temperature of the process fluid flowing through the fluid flow path from the first temperature to a second temperature that is different from the first temperature. The means for changing the temperature includes an annular plenum integrally formed in the valve body or the bonnet immediately adjacent to a portion of the fluid flow path.

In accordance with a third exemplary aspect of the present disclosure, a method of manufacturing is disclosed. The method includes creating a valve control assembly using an additive manufacturing technique. The act of creating includes forming a valve body that defines an inlet, an outlet, and a fluid flow path extending between the inlet and the outlet. The inlet is adapted to be coupled to a source of process fluid having a first temperature. The act of creating also includes forming a means for changing a temperature of the process fluid flowing through the fluid flow path from the first temperature to a second temperature that is different from the first temperature. The act of forming the means for changing the temperature of the process fluid includes forming an annular plenum in the valve body or the bonnet immediately adjacent a portion of the fluid flow path.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several Figures, in which:

FIG. 6 is a table providing the vapor pressure of water at various temperatures.

DETAILED DESCRIPTION

The present disclosure is generally directed to a method of manufacturing a device that more effectively reduces fluid pressure than conventional fluid pressure reduction devices and, at the same time, is easier and less costly to manufacture than such conventional fluid pressure reduction devices. The method described herein utilizes cutting edge manufacturing techniques, e.g., additive manufacturing, to facilitate custom manufacturing of a fluid pressure reduction device that includes any number of integrally formed passages to cool or heat a process fluid. Thus, the fluid pressure reduction device can, for example, include complex flow paths that utilize substantially the entire profile of the device, thereby maximizing (or at least enhancing) flow path lengths and, in turn, maximizing (or at least enhancing) the cooling and heating capabilities of the device.

Figure 1:
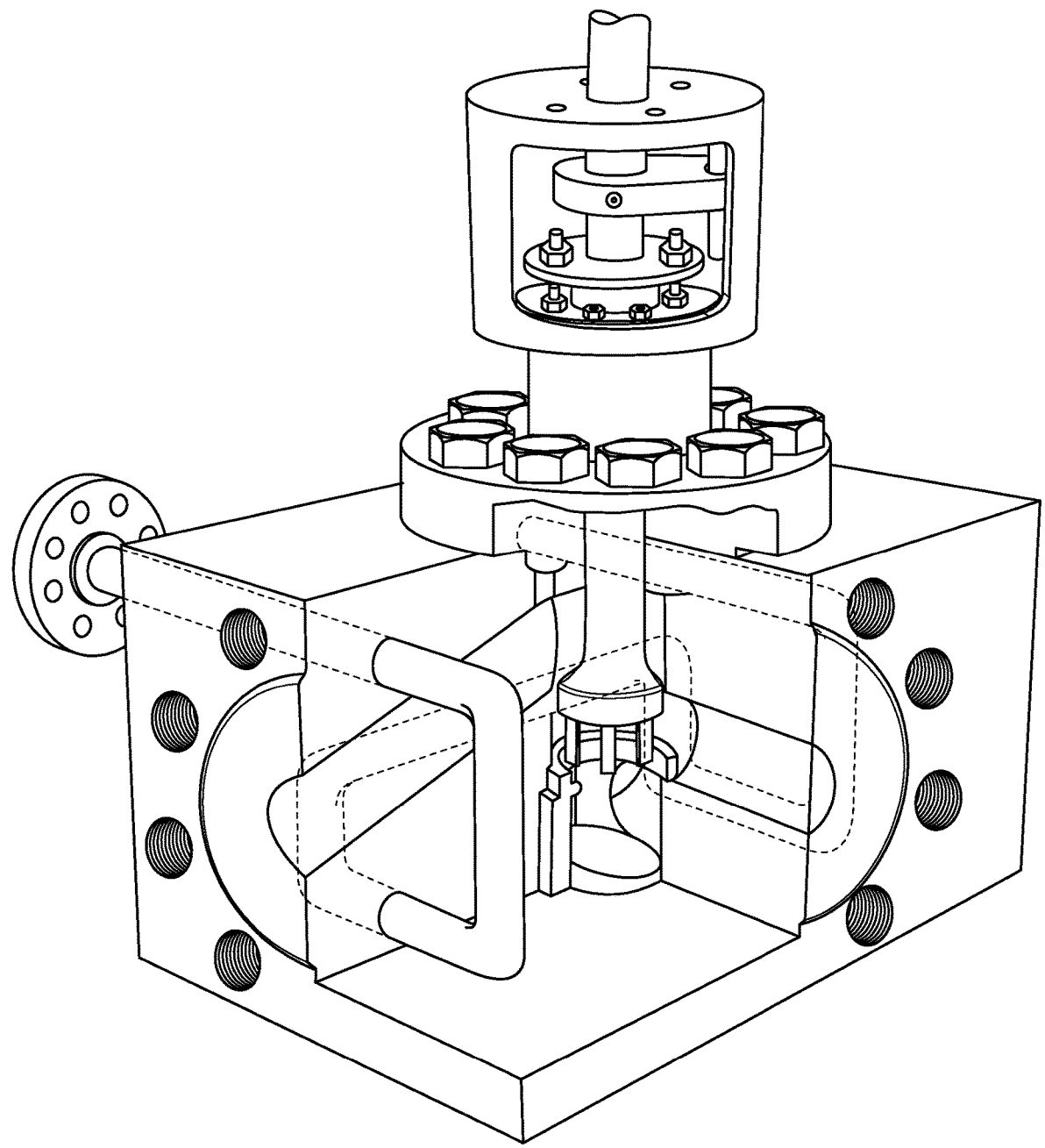
FIG. 1 is a perspective view of a conventional high viscous polymer ("HVP") flow control valve.
Figure 2:
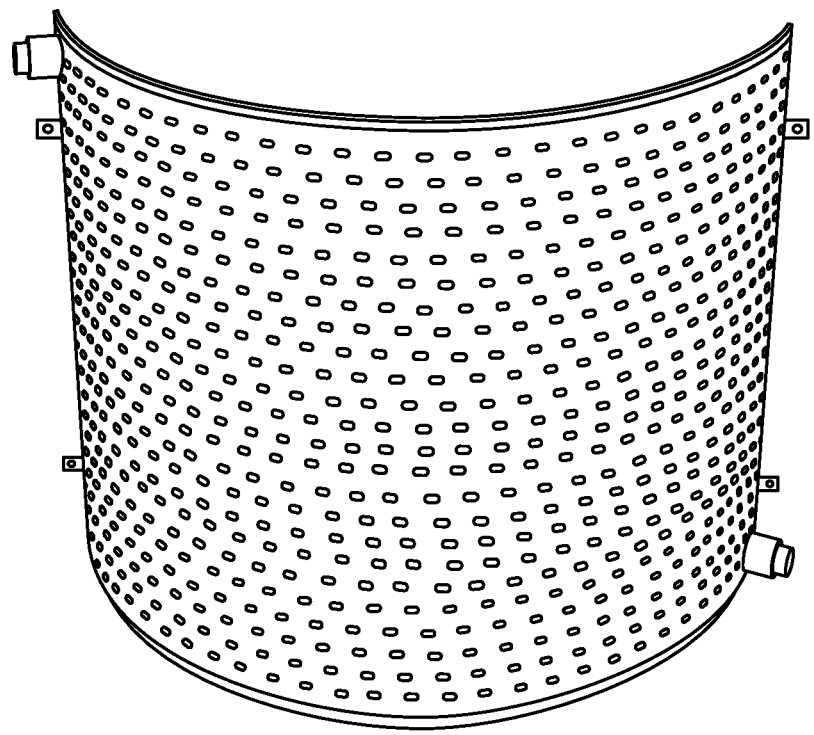
FIG. 2 is a perspective view of a conventional Mueller® plate.
Figure 3:
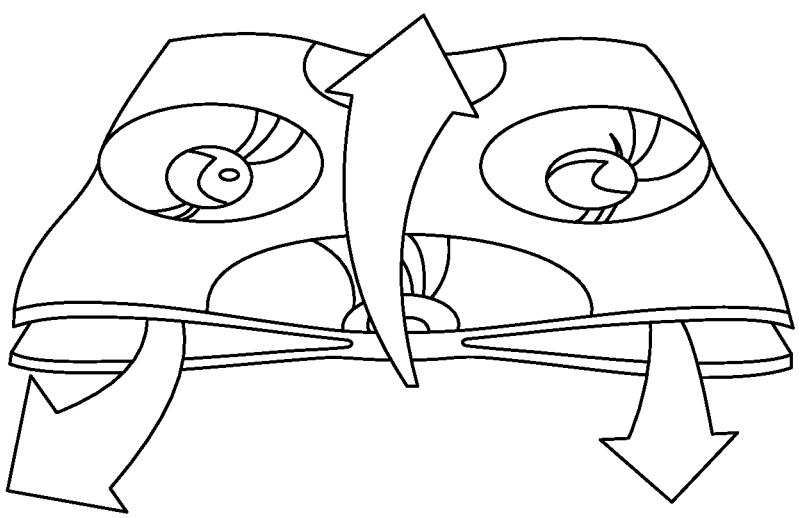
FIG. 3 is a perspective view of a cross-section of the conventional Mueller® plate of FIG. 2.
Figure 4:
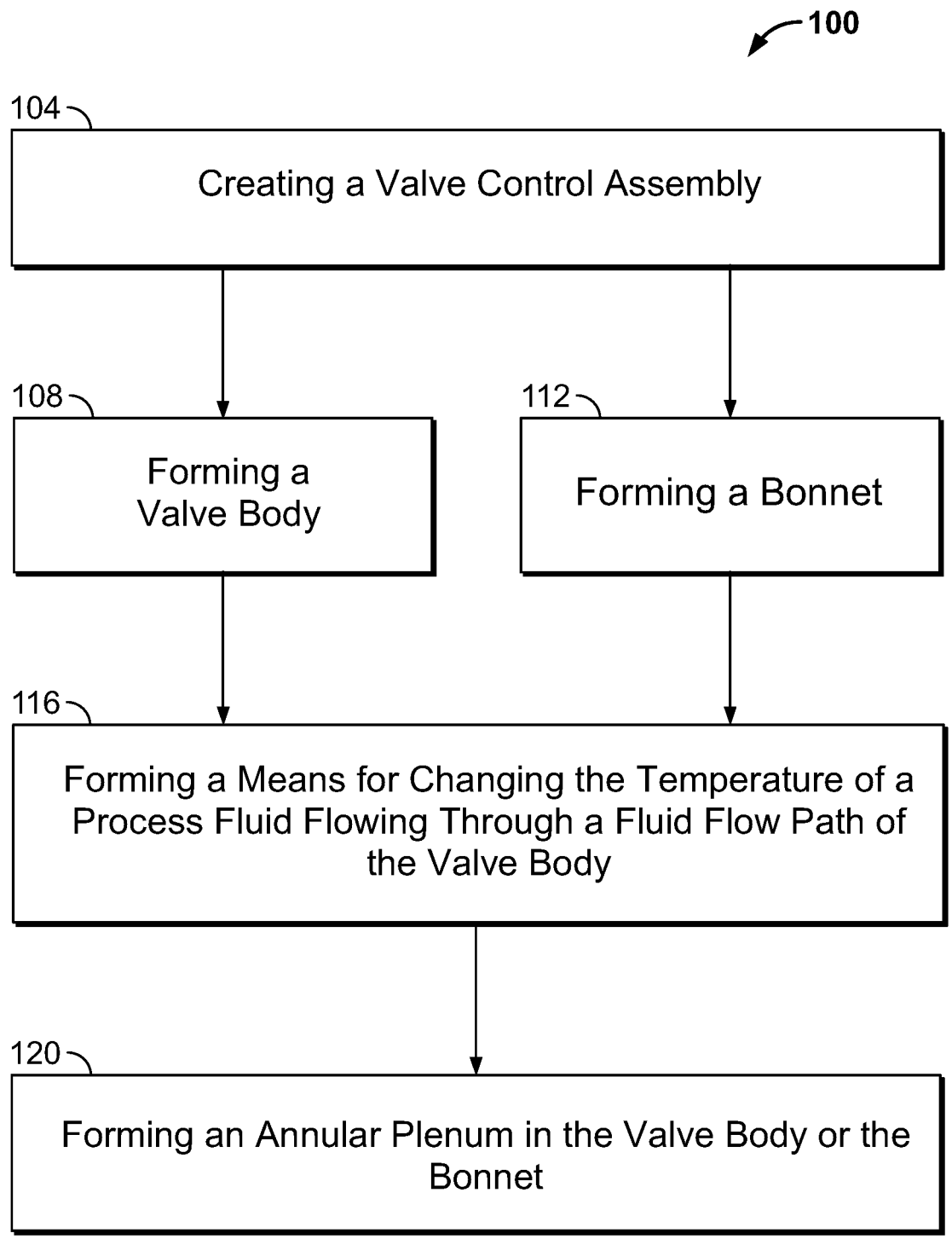
FIG. 4 is a schematic diagram of one example of a process or method according to the teachings of the present disclosure for manufacturing a valve control assembly.

FIG. 4 is a diagram of an example of a method or process 100 according to the teachings of the present disclosure. The method or process 100 schematically illustrated in FIG. 4 is a method or process of custom manufacturing a fluid pressure reduction device. Like the conventional fluid pressure reduction devices described above (e.g., a valve for reducing or eliminating solidification in applications using high viscosity polymers or a Mueller® plate), fluid pressure reduction devices manufactured according to the method or process 100 are configured to reduce the pressure of the fluid flowing therethrough, but, as described above, more efficiently reduce fluid pressure than conventional fluid pressure reduction devices and, at the same time, are easier and less costly to manufacture than conventional fluid pressure reduction devices.

More specifically, the method 100 includes the act 104 of creating a valve control assembly, using an additive manufacturing technique, based on the given application. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design ("CAD") software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA"), a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerical-control ("CNC") lathe with directed energy laser deposition capabilities.

The act 104 of creating the valve control assembly includes forming a valve body (act 108) and forming a bonnet (act 112). The valve body and the bonnet can be made from one or more suitable materials, such as, for example, stainless steel, aluminum, various alloys, and by virtue of being customizable, can be any number of different shapes and/or sizes. The act 104 further includes forming a means for changing the temperature of a process fluid flowing through a fluid flow path of the valve body (collectively, "the means") (act 116). The act 116 includes forming an annular plenum in the valve body or the bonnet (act 120).

As discussed above, the usage of additive manufacturing techniques to custom manufacture the fluid pressure reduction device allows the means to be formed based on the desired application. In other words, the means are customizable. By virtue of being customizable, the means can be unique and complex (as opposed to simple), have any number of different sizes and/or shapes in cross-section, and/or be arranged in any number of patterns. As a result, one or more annular plenums may be formed to include or define multiple different temperature regions (e.g., a first temperature region and a second temperature region where temperature is less than the temperature in the first temperature region).

While not shown, the act 104 can further include forming an inlet port in the valve body or the bonnet where the inlet port is adapted to be coupled to a source of media that has a control temperature that is different from the first temperature. The act 104 can also further include forming an inlet passage in the valve body or the bonnet to direct the media from the inlet port to the annular plenum, forming an outlet port in the valve body or the bonnet, and forming an outlet passage in the valve body or the bonnet to direct the media from the annular plenum to the outlet port.

It will be appreciated that the act 104 (and the acts 108, 112, 116, 120) can be performed any number of different times. The act 104 can, for example, be performed multiple times so as to create multiple valve control assemblies (or components thereof) or other fluid pressure reduction devices, with each valve control assembly (or components thereof) created for a specific application. The act 104 can, alternatively or additionally, be performed multiple times so as to create valve control assemblies for use in multiple similar or different process control systems.

Figure 5:
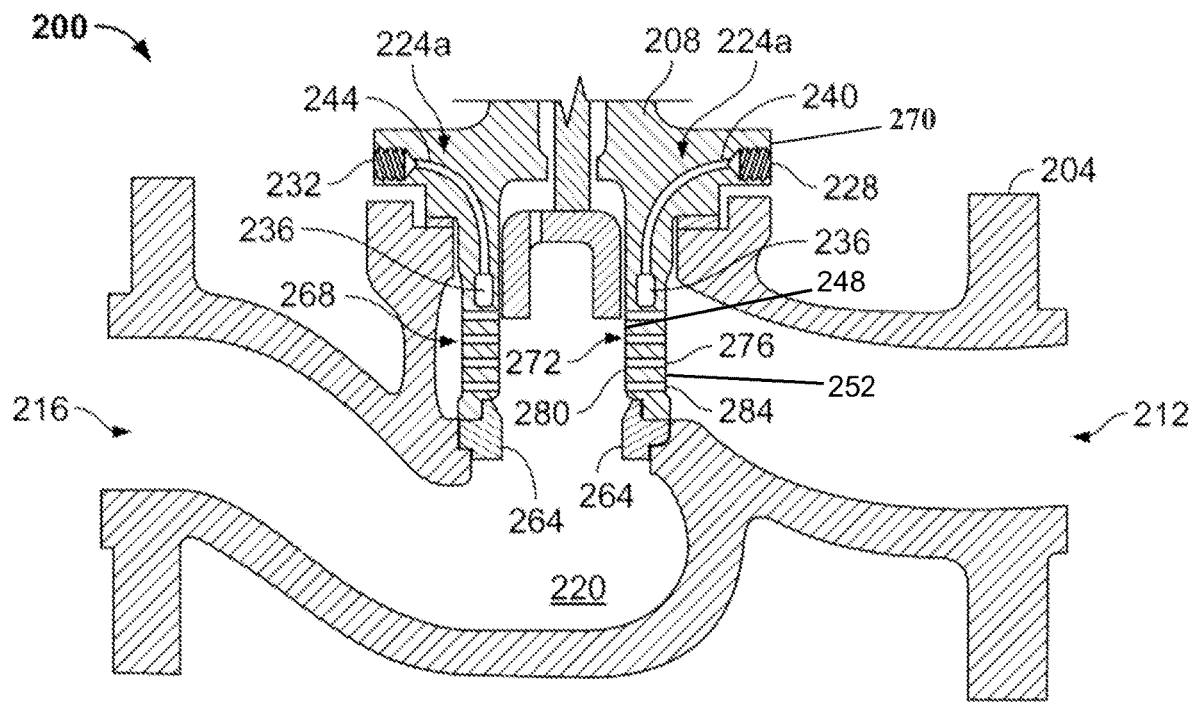
FIG. 5 is a cross-sectional view of an example valve control assembly constructed in accordance with the present disclosure.

FIGS. 5 and 6 illustrate a first example of a valve control assembly 200 manufactured using the process or method 100. The valve control assembly 200 generally includes a valve body 204 and a bonnet 208 coupled to the valve body 204. The valve body 204 includes an inlet 212 that is adapted to be coupled to a source of process fluid, which has a first temperature, an outlet 216, and a fluid flow path 220 that extends between the inlet 212 and the outlet 216. The valve control assembly 200 further includes a means 224a for changing a temperature of the process fluid from the first temperature to a second temperature, where the second temperature is different from the first temperature. In this example, the means 224a is integrally formed within the bonnet 208, but in other examples, the means 224a can be integrally formed within the valve body 204 or another component of the valve control assembly 200. In some examples, the means 224a can change the temperature of the process fluid from the first temperature to the second temperature by increasing the temperature of the process fluid, thereby heating the process fluid (to, for example, reduce if not prevent solidification). In other examples, the means 224a can change the temperature of the process fluid from the first temperature to the second temperature by decreasing the temperature of the process fluid, thereby cooling the process fluid (to, for example, reduce if not prevent cavitation).

The valve control assembly 200 further includes a valve seat 264 arranged in the valve body 208 along the fluid flow path 220 and a valve cage 268 coupled to the valve seat 264. In this example, as illustrated in FIG. 6, the valve cage 268 is integrally formed with the bonnet 208, with the valve cage 268 extending outward (downward in FIG. 5) from a flanged portion 270 of the bonnet 208. In other examples, however, the valve cage 268 and the bonnet 208 can be two separate elements, such that the valve cage 268 is disposed between the bonnet 208 and the valve seat 264. In any case, the valve cage 268 includes one or more fluid passages 272 formed to allow the process fluid to flow through the valve cage 268 (and, more generally, the bonnet 208) as the process fluid is flowing from the inlet 212 to the outlet 216. Each of the one or more fluid passages 272 is defined by an inlet aperture 276, an outlet aperture 280, and an intermediate section 284 extending between the inlet and outlet apertures 276, 280. The inlet apertures 276 are formed in and through an outer surface 252 of the bonnet 208 and the outlet apertures 280 are formed in and through an inner surface 248 of the bonnet 208. The intermediate section 284 extends through the bonnet 208 from the inlet aperture 276 to the outlet aperture 280.

In this example, the means 224a generally includes an inlet port 228, an outlet port 232, an annular plenum 236, an inlet passage 240, and an outlet passage 244, each of which is integrally formed within the bonnet 208 using the process or method 100. In particular, the inlet port 228 is integrally formed in the flanged portion 270 of the bonnet 208, such that the inlet port 228 is arranged to be coupled to a source of media having a temperature that is different from a temperature of the process fluid flowing through the fluid flow path 220. In this example, the inlet port 228 is a circular, threaded bore that extends radially inward from a perimeter of the bonnet 208 and, as such, is configured to receive a threaded end of a fluid line that fluidly couples the inlet port 228 to the source of media. In other examples, the inlet port 228 can be a bore that fixedly receives a Mur-Loc® fitting. The outlet port 232 is also integrally formed in the flanged portion 270 of the bonnet 208, but at a position opposite the inlet port 228, such that the outlet port 232 is arranged to exhaust the media out of the valve assembly 200. The outlet port 232, which in this example is a circular, threaded bore like the inlet port 228, is configured to exhaust the media after it has passed through and out of the annular plenum 236.

The annular plenum 236 is disposed between the inlet port 228 and the outlet port 232 and is positioned immediately adjacent to a portion of the fluid flow path 220, such that the annular plenum 236 is positioned to change the temperature of the process fluid from the first temperature to the second temperature. In this example, the annular plenum 236 is positioned in the valve cage 268 of the bonnet 208, and, more particularly, immediately adjacent one of the fluid passages 272 formed in the valve cage 268. As illustrated, the annular plenum 236 in this example extends three hundred and sixty degrees (360°) around and within the bonnet 208 at a position between the inner and outer surfaces 248, 252 of the bonnet 208, though in other examples the annular plenum 236 can extend only partially around the bonnet 208. In yet other examples, a non-annular plenum may be used in place of the annular plenum 236. In those such examples, the non-annular plenum can have a rectangular, triangular, elliptical, irregular, or other cross-sectional shape. Additionally, while not illustrated herein, it will be appreciated that the annular plenum 236 may be coated with a material that is different from the material that is used to construct the bonnet 208.

The inlet passage 240 is disposed between the inlet port 228 and the annular plenum 236 and serves to direct the media received at the inlet port 228 to the annular plenum 236. The inlet passage 240 may have any number of different sizes and/or shapes (e.g., a circular, rectangular, triangular, elliptical, irregular, or other cross-sectional shape), depending on the application as well as the shape of the bonnet 208.

As illustrated in FIG. 5, the inlet passage 240 in this example follows a curved path from the inlet port 228 to the annular plenum 236. Alternatively, the inlet passage 240 may follow a linear path, an "L" shaped path, a diagonal path, or any other suitably shaped path.

The outlet passage 244, which is similar to the inlet passage 240, is disposed between the annular plenum 236 and the outlet port 232 and serves to direct the media that has been directed to and into the annular plenum 236 from the annular plenum 236 to the outlet port 232. In other words, the outlet passage 244 serves to exhaust the media from the annular plenum 236 and out of the valve assembly 200. The outlet passage 244 may have any number of different sizes and/or shapes (e.g., a circular, rectangular, triangular, elliptical, irregular, or other cross-sectional shape), including sizes and/or shapes identical to or different from the inlet passage 240, depending on the application as well as the shape of the bonnet 208. As illustrated in FIG. 5, the outlet passage 244 in this example follows a curved path from the outlet port 232 to the annular plenum 236. Alternatively, the outlet passage 244 may follow a linear path, an "L" shaped path, a diagonal path, or any other suitably shaped path.

In operation, the media flows into the inlet passage 240, through the inlet port 228, and from the inlet port 228 to the annular plenum 236 through the inlet passage 240, and once the media fills the annular plenum 236, the media flows from the annular plenum 236 to the outlet port 232 through the outlet passage 244 and then out of the valve control assembly 200 via the outlet port 232. In turn, the means 224a, and in particular the annular plenum 236, leverages the media flowing therethrough to change the temperature of the process fluid flowing through the portion of the fluid flow path 220 immediately adjacent the annular plenum 236 from the first temperature to the second temperature. In this example, the means 224a utilizes the media to cool the process fluid as the process fluid flows through the portion of the fluid flow path 220 immediately adjacent the annular plenum 236, such that the first temperature is greater than the second temperature. In this example (where the media cools the process fluid), the media can, for example, be water, a glycol and water mixture, or liquid nitrogen. In other examples, however, the means 224a utilizes the media to heat the process fluid as the process fluid flows through the portion of the fluid flow path 220 immediately adjacent the annular plenum 236. In these examples (where the media heats the process fluid), the media can, for example, be saturated steam, superheated water, or oil.

Heating or cooling the process fluid flowing through the fluid flow path 220 in this manner eliminates or reduces problems associated with pressure reduction. Specifically, reducing the temperature of the process fluid as the process fluid flows through the valve assembly 200 reduces the vapor pressure of the process fluid, which in turn decreases the likelihood of cavitation occurring in the process fluid while the valve assembly 200 reduces the pressure of the process fluid. For example, as illustrated in FIG. 6, water flowing through the valve assembly 200 at a temperature of 212° F. has a vapor pressure of 14.70 pounds per square inch ("psi"). Accordingly, if the pressure of the water entering or flowing through the valve assembly 200 is equal to 100 psi and needs to be reduced to 10 psi, cavitation will occur since the desired operating pressure of 10 psi is lower than the vapor pressure of water at 212° F. (14.70 psi). However, reducing the temperature of the water to 185° F. lowers the vapor pressure of water to 8.38 psi, which is below the desired operating pressure of 10 psi. Therefore, by reducing the temperature of water from 212° F. to 185° F. prior to reducing the operating pressure from 100 psi to 10 psi, cavitation in the water flowing through the valve assembly 200 can be prevented.

While not illustrated herein, the outlet port 232 may also be coupled to a recirculation line (not shown) that fluidly couples the outlet port 232 to the inlet port 228 outside of the valve assembly 200. In particular, in some examples, the recirculation line could extend from the outlet port 232 to the source of media. In such an example, the temperature of the media can be returned to the control temperature when the media is returned to the source of media via the recirculation line. In other examples, the recirculation line can couple the outlet port 232 to a heat exchanger (not shown). In such an example, the heat exchanger can change the temperature of the media from the temperature at the outlet port 232 (after the media has passed through the annular plenum 236) to the control temperature. In some cases, the heat exchanger may heat the media back to the control temperature, while in other examples, the heat exchanger may cool the media to return the temperature of the media to the control temperature. Coupling the heat exchanger in line with the recirculation line allows the recirculation line to be coupled directly to the inlet port 228, since the media will be at the control temperature necessary to change the temperature of the process fluid flowing through the fluid flow path 220.

Figure 7:
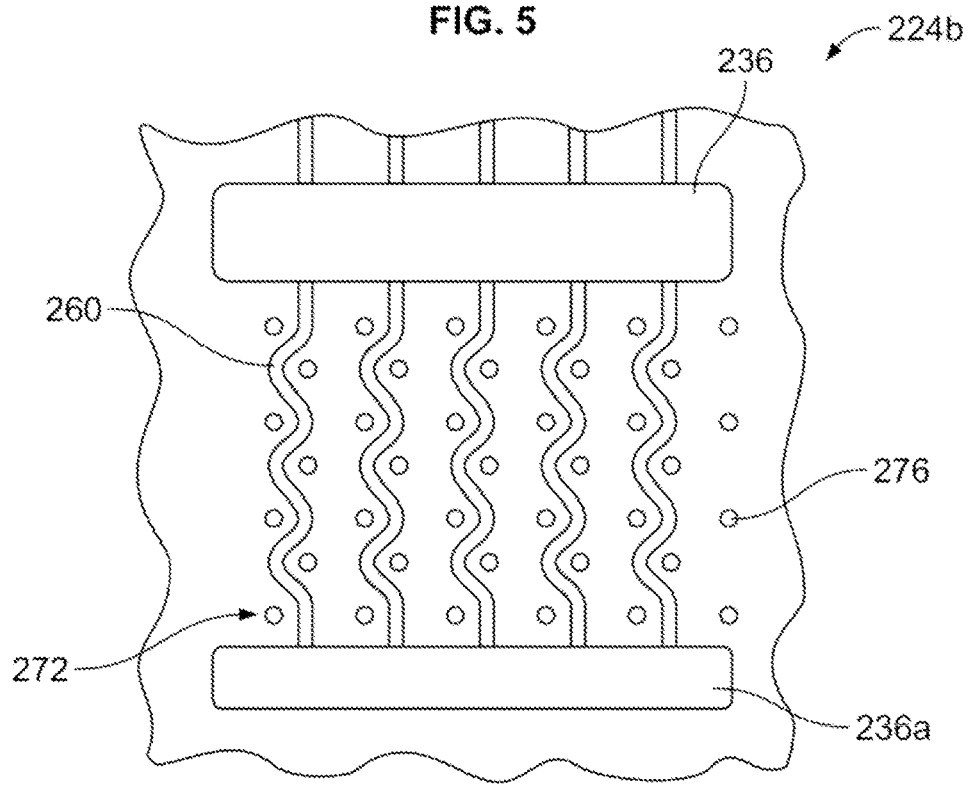
FIG. 7 is a cross-sectional view of a bonnet of the valve control assembly of FIG. 5.

FIG. 7 illustrates a portion of another example of means 224*b* for changing the temperature of the process fluid flowing through the portion of the fluid flow path 220 of the valve control assembly 200. The example means 224*b* illustrated in FIG. 7 is similar to the means 224*a* illustrated in FIG. 5, in that the means 224*b* is integrally formed in the bonnet 208 and includes the inlet port 228, the outlet port 232, the annular plenum 236, the inlet passage 240, and the outlet passage 244, but is different in that the means 224*b* includes an additional annular plenum 236*a* integrally formed in the bonnet 208 and at least one internal passage 260 integrally formed in the bonnet 208 that fluidly couples the annular plenum 236 to the additional annular plenum 236*a*. In this example, the means 224*b* includes a plurality of internal passages 260, though it will be appreciated that the means 224*b* may instead only include a single internal passage 260.

As with the annular plenum 236, the additional annular plenum 236*a* is disposed between the inlet port 228 and the outlet port 232 and is positioned immediately adjacent to another portion of the fluid flow path 220, such that the additional annular plenum 236*a* is likewise positioned to change the temperature of the process fluid flowing through the fluid flow path 220 from the first temperature to the second temperature, but does so even more efficiently because of the at least one internal passages 260. In some examples, the annular plenum 236 may be disposed above the fluid passages 272 and the additional annular plenum 236*a* may be disposed below the fluid passages 272, with respect to the orientation shown in FIG. 5. In some examples, the additional annular plenum 236*a* can be positioned closer toward the inner or outer surface 248, 252 of the bonnet 208, or, in other examples, the additional annular plenum 236*a* can be equidistant from the inner and outer surfaces 248, 252 of the bonnet 208. The additional annular plenum 236*a* may also extend three hundred and sixty degrees (360°) around and within the bonnet 208, just as the annular plenum 236 does, or may only extend partially around the bonnet 208. In yet other examples, a non-annular plenum may be used in place of the additional annular plenum 236*a*. In those such examples, the additional annular plenum 236*a* may have a rectangular, triangular, elliptical, irregular, or other cross-sectional shape. The additional annular plenum 236*a* may have the same cross-sectional shape as the annular plenum 236. However, in other examples, the additional annular plenum 236*a* may have a different cross-sectional shape than the annular plenum 236.

Each of the at least one internal passages 260 extends between the annular plenum 236 and the additional annular plenum 236*a* in the bonnet 208 between the inner and outer surfaces 248, 252 of the bonnet 208. The at least one internal passage 260 may follow any path from the annular plenum 236 to the additional annular plenum 236*a*. In some cases, each of the at least one internal passages 260 may wrap around the one or more fluid passages 272 in the valve cage 268. In the example illustrated in FIG. 6, each of the at least one internal passages 260 follows a curvilinear path from the annular plenum 236 to the additional annular plenum 236*a*. In other examples, however, one or more of the at least one internal passages 260 may follow a linear path, e.g., a diagonal path, or other shaped path from the annular plenum 236 to the additional annular plenum 236*a*. Each of the at least one internal passages 260 may take any cross-sectional shape depending on the shape of the bonnet 208. For example, each of the at least one internal passages 260 can have a circular, rectangular, triangular, elliptical, irregular, or other cross-sectional shape.

Further, the means 224*b* illustrated in FIG. 7 is different from the means 224*a* illustrated in FIG. 5 in that the outlet passage 244 extends from the outlet port 232 to the additional annular plenum 236*a* rather than to the annular plenum 236. In such an example, the media is directed from the inlet port 228 to the annular plenum 236 via the inlet passage 240 and flows from the annular plenum 236 to the additional annular plenum 236*a* through the at least one internal passage 260. The media in the additional annular plenum 236*a* then flows from the additional annular plenum 236*a* to the outlet port 232 via the outlet passage 244.

Figure 8:
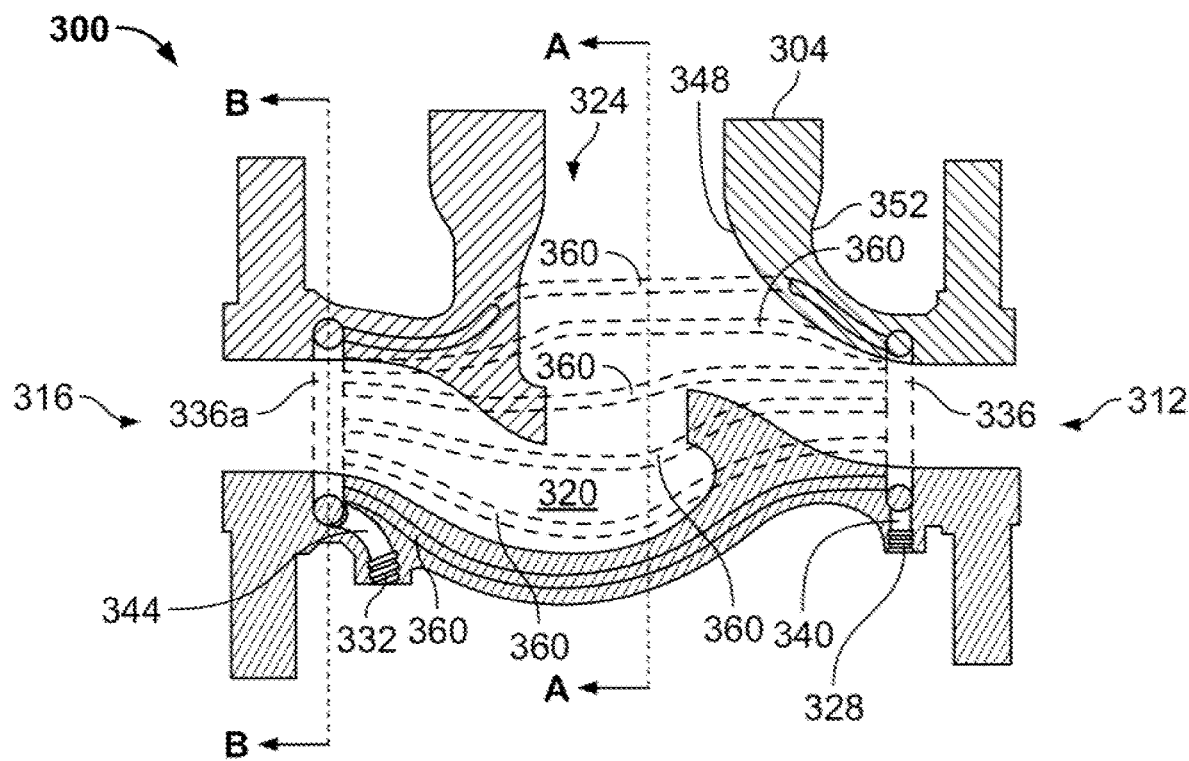
FIG. 8 is a cross-sectional view of another example valve control assembly constructed in accordance with the present disclosure.
Figure 9:
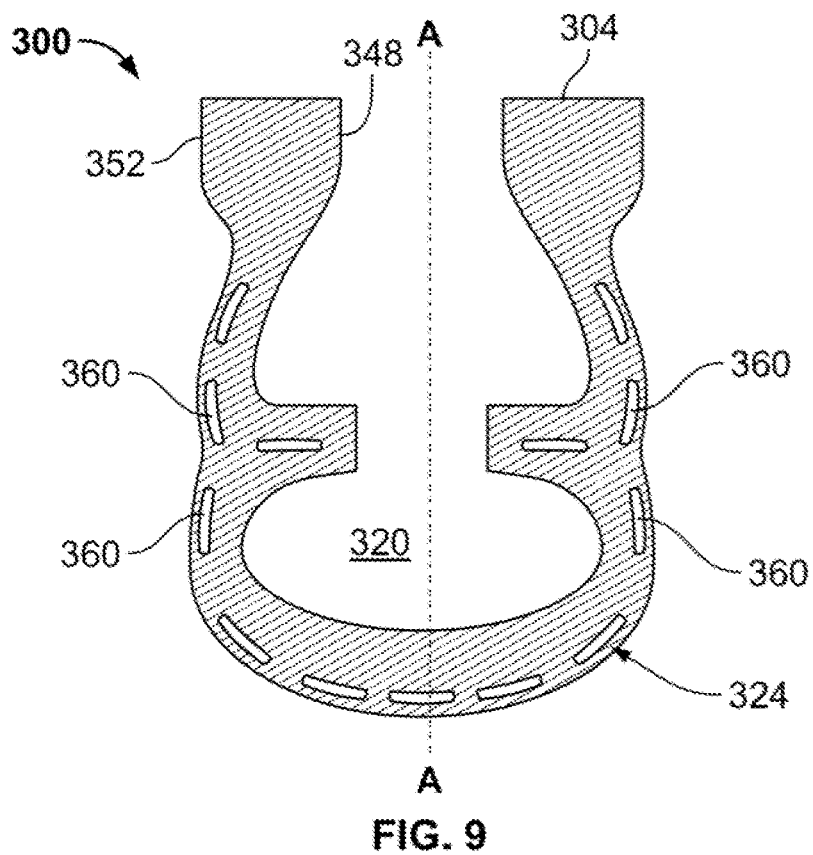
FIG. 9 is a cross-sectional view taken at line A-A of the example valve control assembly of FIG. 8.
Figure 10:
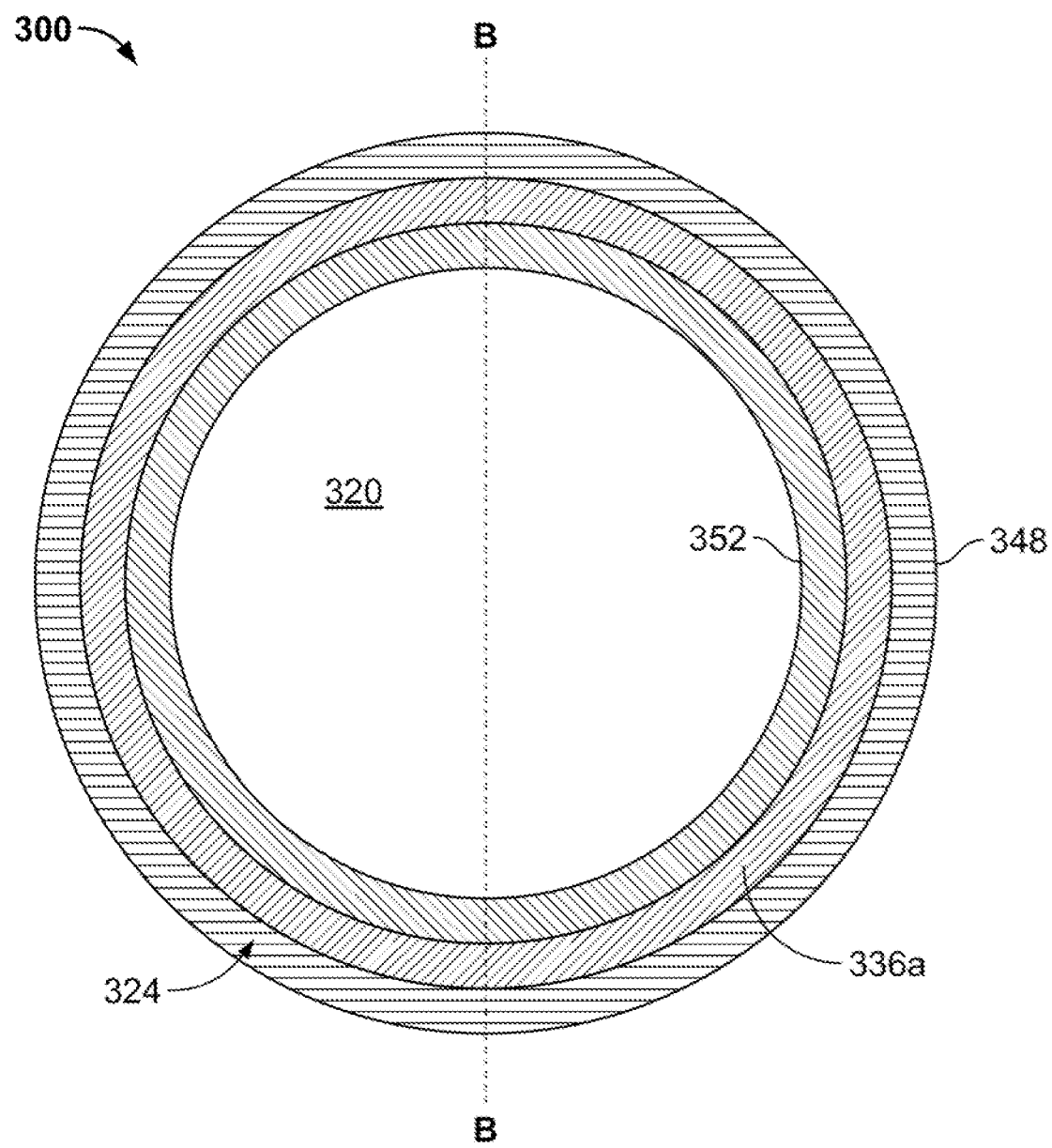
FIG. 10 is a cross-sectional view taken at line B-B of the example valve control assembly of FIG. 8.

FIGS. 8-10 illustrate another example of a valve control assembly 300 custom manufactured using the method or process 100. The valve control assembly 300 illustrated in FIGS. 8-10 is similar to the valve control assembly 200 illustrated in FIG. 5, in that the valve control assembly 300 includes a valve body 304 and a bonnet (not shown) coupled to the valve body 304, but is different in that the valve control assembly 300 includes a different means 324 for changing the temperature of the process fluid flowing through a portion of the fluid flow path 320 of the valve control assembly 300, and the means 324 is integrally formed within the valve body 304 (instead of the bonnet).

As with the means 224*a* and the means 224*b*, the means 324 changes the temperature of the process fluid flowing through the portion of the fluid flow path 320 from the first temperature to the second temperature. The means 324 illustrated in FIGS. 8-10 includes an inlet port 328, an outlet port 332, an annular plenum 336, an additional annular plenum 336*a*, an inlet passage 340, an outlet passage 344, and at least one internal passage 360, each of which is integrally formed within the valve body 304. In particular, the inlet port 328 is integrally formed in the valve body and is disposed along the perimeter of the valve body 304, such that the inlet port 328 is arranged to be coupled to the source of media having a temperature that is different from a temperature of the process fluid flowing through the fluid flow path 320. Disposing the inlet port 328 along the perimeter of the valve body 304 allows unobstructed access to the inlet port 328 when coupling the source of media to the inlet port 328. The inlet port 328 may take the form of any mechanism for coupling the source of media to the inlet port 328. In some cases, the inlet port 328 takes the form of a mechanism for releasably coupling the source of media to the inlet port 328. In this example, the inlet port 328 takes the form of a circular, threaded bore that extends radially inward from the perimeter of the valve body 304 and, as such, is configured to receive a threaded end of a fluid line that couples the inlet port 328 to the source of media. In other examples, the inlet port 328 can take the form of a bore that fixedly receives a Mur-Lock® fitting. The outlet port 332 is also integrally formed in the perimeter of the valve body 304, but at a position opposite the inlet port 328, such that the outlet port 332 is arranged to exhaust the media out of the valve assembly 300. The outlet port 332, which in this examples is a circular, threaded bore like the inlet port 328, is configured to exhaust the media after it passes through and out of the additional annular plenum 336a.

The annular plenum 336 is disposed within the valve body 304 between the inlet port 328 and the at least one internal passage 360, and is positioned immediately adjacent a portion of the fluid flow path 320, such that the annular plenum 336 is positioned to change the temperature of the process fluid from the first temperature to the second temperature. In this example, the annular plenum 336 is positioned within the valve body 304 proximate the inlet 312 and immediately adjacent to a portion of the fluid flow path 320. As illustrated, the annular plenum 336 in this example extends three hundred and sixty degrees (360°) around and within the valve body 304 at a position between the inner and outer surfaces 348, 352 of the valve body 304, though in other examples the annular plenum 336 can extend only partially around the valve body 304. In yet other examples, a non-annular plenum may be used in place of the annular plenum 336. In those such examples, the non-annular plenum can have a rectangular, triangular, elliptical, irregular, or other cross-sectional shape. The annular plenum 336 may be disposed equidistant from the inner and outer surfaces 348, 352 of the valve body 304. In other examples, however, the annular plenum 336 can be disposed toward the inner surface 348 of the valve body 304 or, in other examples, can be disposed toward the outer surface 352 of the valve body 304. Additionally, while not illustrated herein, it will be appreciated that the annular plenum 336 may be coated with a material that is different from the material that is used to construct the valve body 304.

The inlet passage 340 is disposed between the inlet port 328 and the annular plenum 336 and serves to direct the media received at the inlet port 328 to the annular plenum 336. The inlet passage 340 may take any number of different sizes and/or shapes (e.g., a circular, rectangular, triangular, elliptical, irregular, or other cross-sectional shape), depending on the application as well as the shape of the valve body 304. As illustrated in FIG. 8, the inlet passage 340 in this example follows a linear path from the inlet port 328 to the annular plenum 336. Alternatively, the inlet passage 340 can follow a curved path, an "L" shaped path, a diagonal path, or any other suitable shaped path.

The outlet passage 344, which is similar to the inlet passage 340, is disposed between the additional annular plenum 336a and the outlet port 332 and serves to direct the media that has been directed to and into the additional annular plenum 336a from the additional annular plenum 336a to the outlet port 332. In other words, the outlet passage 344 serves to exhaust the media from the additional annular plenum 336a and out of the valve assembly 300 (via the outlet port 332). The outlet passage 344 may have any number of different sizes and/or shapes (e.g., a circular, rectangular, triangular, elliptical, irregular, or other cross-sectional shape), including sizes and/or shapes identical to or different from the inlet passage 340, depending on the application as well as the shape of the valve body 304. As illustrated in FIG. 8, the outlet passage 344 in this example follows a curved path from the outlet port 332 to the additional annular plenum 336a. Alternatively, the outlet passage 344 may follow a linear path, an "L" shaped path, a diagonal path, or any other suitably shaped path.

The additional annular plenum 336a is disposed between the outlet port 332 and the at least one internal passage 360, and is positioned immediately adjacent to a portion of the fluid flow path 320, such that the additional annular plenum 336a is positioned to change the temperature of the process fluid from the first temperature to the second temperature. In this example, the additional annular plenum 336a is positioned within the valve body 304 proximate the outlet 316 and immediately adjacent to a portion of the fluid flow path 320, such that the additional annular plenum 336a is opposite the annular plenum 336. As illustrated, the additional annular plenum 336a in this example extends three hundred and sixty degrees (360°) around and within the valve body 304 at a position between the inner and outer surfaces 348, 352 of the valve body 304, though in other examples the annular plenum 336 can extend only partially around the valve body 304. In yet other examples, an additional non-annular plenum may be used in place of the additional annular plenum 336a. In those such examples, the additional non-annular plenum can have a rectangular, triangular, elliptical, irregular, or other cross-sectional shape. The additional annular plenum 336a may be disposed equidistant from the inner and outer surfaces 348, 352 of the valve body 304. In other examples, however, the additional annular plenum 336a can be disposed toward the inner surface 348 of the valve body 304 or, in other examples, can be disposed toward the outer surface 352 of the valve body 304. Additionally, while not illustrated herein, it will be appreciated that the additional annular plenum 336a may be coated with a material that is different from the material that is used to construct the valve body 304.

Each of the at least one internal passages 360 is integrally formed in the valve body 304 and extends between the annular plenum 336 and the additional annular plenum 336a. In particular, each of the at least one internal passages 360 is integrally formed in the the valve body 304 between the inner and outer surfaces 348, 352 of the valve body 304, such that the internal passages 360 are disposed immediately adjacent the flow path 320. The at least one internal passage 360 may follow any path from the annular plenum 336 to the additional annular plenum 336a. In the example illustrated in FIG. 8, each of the at least one internal passages 360 follows a curvilinear path from the annular plenum 336 to the additional annular plenum 336a. In other examples, however, one or more of the at least one internal passages 360 may follow a linear path, e.g., a diagonal path, or other shaped path from the annular plenum 336 to the additional annular plenum 336a (not shown). Each of the at least one internal passages 360 may take any cross-sectional shape depending on the shape of the valve body 304. For example, each of the at least one internal passages 360 can have a circular, rectangular, triangular, elliptical, irregular, or other cross-sectional shape. As depicted in FIG. 9, each of the at least one passages 360 can be disposed proximate the outer surface 352 of the valve body 304. In other examples, each of the at least one passages 360 can be disposed proximate the inner surface 348 of the valve body 304. In yet other examples, each of the at least one passages 360 can be disposed equidistant from the inner and outer surfaces 348, 352.

In operation, the media flows into the inlet passage 340, through the inlet port 328, and from the inlet port 328 to the annular plenum 336 through the inlet passage 340, and once the media fills the annular plenum 336, the media flows from the annular plenum 336 to and into the additional annular plenum 336a through each of the at least one passages 360 integrally formed in the valve body 304. The media then flows from the additional annular plenum 336a to outlet port 332 through the outlet passage 344 and then out of the valve control assembly 300 via the outlet port 332. In turn, the means 324 leverages the media flowing therethrough to change the temperature of the process fluid flowing through the portions of the fluid flow path 320 immediately adjacent the annular plenum 336, the additional annular plenum 336a, and each of the at least one passages 360 from the first temperature to the second temperature. In this example, the means 324 utilizes the media to cool the process fluid as the process fluid flows through the fluid flow path 320, such that the first temperature is greater than the second temperature. In this example (where the media cools the process fluid), the media can, for example, be water, a glycol and water mixture, or liquid nitrogen. In other examples, however, the means 324 may utilize the media to heat the process fluid as the process fluid flows through the fluid flow path 320. In these other examples (where the media heats the process fluid), the media can, for example, be saturated steam, superheated water, or oil. In any case, heating or cooling the process fluid flowing through the fluid flow path 320 in this manner eliminates or reduces problems associated with pressure reduction, just as is the case with the valve assembly 200 described above.

While not illustrated herein, the outlet port 332 may also be coupled to a recirculation line (not shown) that fluidly couples the outlet port 332 to the inlet port 328 outside of the valve assembly 300. In particular, in some examples, the recirculation line can extend from the outlet port 332 to the source of media. In such an example, the temperature of the media can be returned to the control temperature when the media is returned to the source of the media via the recirculation line. In other examples, the recirculation line can couple the outlet port 332 to a heat exchanger (not shown). In such an example, the heat exchanger can change the temperature of the media from the temperature at the outlet port 332 (after the media has passed through the annular plenum 236) to the control temperature. In some cases, the heat exchanger may heat the media back to the control temperature, while in other examples, the heat exchanger may cool the media to return the temperature of the media to the control temperature. Coupling the heat exchanger in line with the recirculation line allows the recirculation line to be coupled directly to the inlet port 328, since the media will be at the control temperature necessary to change the temperature of the process fluid flowing through the fluid flow path 320.

The invention claimed is:

1. A method of manufacturing, comprising:
creating a valve control assembly using an additive manufacturing technique, the creating comprising:
forming a valve body defining an inlet, an outlet, and a fluid flow path extending between the inlet and the outlet, the inlet adapted to be coupled to a source of process fluid having a first temperature;
forming a bonnet, the bonnet coupled to the valve body;
forming a valve cage, the valve cage coupled to the bonnet and at least partially disposed in the valve body, the valve cage comprising a plurality of fluid passages arranged in the fluid flow path; and
forming a means for changing the temperature of the process fluid flowing through the fluid flow path from the first temperature to a second temperature different from the first temperature, wherein forming the means for changing the temperature of the process fluid flowing through the fluid flow path comprises:
integrally forming an inlet port in the valve body or bonnet;
integrally forming an outlet port in the valve body or bonnet at a position opposite the inlet port; and
integrally forming an annular plenum in the valve body, the bonnet, or the valve cage between the inlet port and the outlet port and immediately adjacent a portion of the fluid flow path,
wherein the annular plenum has inner and outer diameters radially disposed within the valve body at a position immediately adjacent the fluid passages of the valve cage,
wherein the annular plenum is radially disposed between an inlet and an outlet of each of the fluid passages of the valve cage, and
wherein the outlet port is formed radially outward of the annular plenum.

2. The method of claim 1, wherein the inlet port is integrally formed in the valve body or the bonnet, the inlet port adapted to be coupled to a source of media, the media having a control temperature different from the first temperature, and wherein forming the means for changing the temperature further comprises:
forming an inlet passage in the valve body or the bonnet to direct the media from the inlet port to the annular plenum, such that the annular plenum changes the temperature of the process fluid flowing through the portion of the fluid flow path from the first temperature to the second temperature; and
forming an outlet passage in the valve body or the bonnet to direct the media from the annular plenum to the outlet port.

3. A valve control assembly for use in a fluid flow control device, the valve control assembly comprising:
a valve body defining an inlet, an outlet, and a fluid flow path extending between the inlet and the outlet, the inlet adapted to be coupled to a source of process fluid having a first temperature;
a bonnet coupled to the valve body;
a valve cage coupled to the bonnet and at least partially disposed in the valve body, the valve cage comprising a plurality of fluid passages arranged in the fluid flow path; and
a means for changing a temperature of the process fluid flowing through the fluid flow path from the first temperature to a second temperature different from the first temperature, the means for changing the temperature comprising:
an inlet port integrally formed in the valve body or bonnet;
an outlet port integrally formed in the valve body or bonnet at a position opposite the inlet port; and
an annular plenum integrally formed in the valve body, the bonnet, or the valve cage between the inlet port and the outlet port and immediately adjacent a portion of the fluid flow path, wherein the annular plenum is disposed within the valve body at a position immediately adjacent the fluid passages of the valve cage, wherein the annular plenum has inner and outer diameters radially disposed between an inlet and an outlet of each of the fluid passages of the valve cage, and wherein the outlet port is formed radially outward of the annular plenum.

4. The valve control assembly of claim 3, wherein the means for changing the temperature comprises means for reducing the temperature, the means for reducing the temperature comprising:

the inlet port, wherein the inlet port is adapted to be coupled to a source of media, the media having a control temperature different from the first temperature;

the outlet port;

the annular plenum;

an inlet passage integrally formed in the valve body or the bonnet to direct the media from the inlet port to the annular plenum, such that the annular plenum changes a temperature of the process fluid flowing through the portion of the fluid flow path from the first temperature to the second temperature different from the first temperature; and an outlet passage integrally formed in the valve body or the bonnet to direct the media from the annular plenum to the outlet port.

5. The valve control assembly of claim 4, wherein the inlet port, the inlet passage, the annular plenum, the outlet passage, and the outlet port are integrally formed in the bonnet.

6. The valve control assembly of claim 2, wherein the inlet passage is partially disposed in the valve body and the outlet passage is partially disposed in the valve body.

7. The valve control assembly of claim 2, wherein the outlet passage directly connects the annular plenum to the outlet port.

8. The valve control assembly of claim 3, wherein the means for changing the temperature comprises means for increasing the temperature, the means for increasing the temperature comprising:

the inlet port, wherein the inlet port is adapted to be coupled to a source of media, the media having a control temperature different from the first temperature;

the outlet port;

the annular plenum integrally formed in the valve body or the bonnet between the inlet port and the outlet port and immediately adjacent the portion of the fluid flow path;

an inlet passage integrally formed in the valve body or the bonnet to direct the media from the inlet port to the annular plenum, such that the annular plenum changes a temperature of the process fluid flowing through the portion of the fluid flow path from the first temperature to the second temperature different from the first temperature; and an outlet passage integrally formed in the valve body or the bonnet to direct the media from the annular plenum to the outlet port.

9. The valve control assembly of claim 8, wherein the inlet port, the inlet passage, the annular plenum, the outlet passage, and the outlet port are integrally formed in the bonnet.

10. The valve control assembly of claim 3, further comprising:

a valve seat arranged in the valve body along the fluid flow path, wherein the valve cage is arranged between the bonnet and the valve seat, wherein the valve cage is seated against the valve seat to retain the valve seat in the valve body, and wherein the annular plenum is arranged immediately adjacent one or more of the plurality of fluid passages.

11. The valve control assembly of claim 3, wherein the annular plenum is entirely disposed within the valve body.

12. The valve control assembly of claim 3, wherein the annular plenum is integrally formed in the valve cage.

13. A valve control assembly for use in a fluid flow control device, the valve control assembly comprising:

a valve body defining an inlet, an outlet, and a fluid flow path extending between the inlet and the outlet, the inlet adapted to be coupled to a source of process fluid, the process fluid having a first temperature;

a bonnet coupled to the valve body;

a valve cage integrally formed with the bonnet and partially disposed in the valve body, the valve cage comprising one or more fluid passages arranged in the fluid flow path;

an inlet port integrally formed in the valve body or the bonnet, the inlet port adapted to be coupled to a source of media, the media having a control temperature different from the first temperature;

an outlet port integrally formed in the valve body or the bonnet;

an annular plenum integrally formed in the valve cage between the inlet port and the outlet port and immediately adjacent a portion of the fluid flow path, wherein the annular plenum is immediately adjacent the one or more fluid passages of the valve cage;

an inlet passage integrally formed in the valve body or the bonnet to direct the media from the inlet port to the annular plenum, such that the annular plenum changes a temperature of the process fluid flowing through the portion of the fluid flow path from the first temperature to a second temperature different from the first temperature; and an outlet passage integrally formed in the valve body or the bonnet to direct the media from the annular plenum to the outlet port, wherein the outlet passage directly connects the annular plenum to the outlet port, and wherein the outlet port is integrally formed in the bonnet and disposed outside the valve body.

14. The valve control assembly of claim 13, wherein the inlet passage is integrally formed in the valve body or the bonnet to direct heat media having a temperature greater than the first temperature from the inlet port to the annular plenum, such that the annular plenum comprises a heat media plenum configured to increase the temperature of the process fluid flowing through the fluid flow path.

15. The valve control assembly of claim 13, wherein the inlet passage is integrally formed in the valve body or the bonnet to direct cold media having a temperature less than the first temperature from the inlet port to the annular plenum, such that the annular plenum comprises a cold media plenum configured to decrease the temperature of the process fluid flowing through the fluid flow path.

16. The valve control assembly of claim 13, wherein the inlet port, the inlet passage, the annular plenum, and the outlet passage are integrally formed in the bonnet.

17. The valve control assembly of claim 13, further comprising:

a valve seat arranged in the valve body along the fluid flow path, wherein the valve cage is arranged between the bonnet and the valve seat, and wherein the annular plenum is arranged immediately adjacent the one or more fluid passages.

18. The valve control assembly of claim 13, further comprising a recirculation loop having one end connected to the outlet port and one end connected to the inlet port, the recirculation loop comprising a heat exchanger configured to increase or decrease an outlet temperature of the media at the outlet port, such that the outlet temperature equals the control temperature.

19. The valve control assembly of claim 13, wherein the inlet passage is partially disposed in the valve body and wherein the outlet passage is partially disposed in the valve body.

20. The valve control assembly of claim 13, further comprising:
- an additional annular plenum integrally formed in the bonnet between the inlet port and the outlet port; and
- one or more internal passages integrally formed in the bonnet and extending between the annular plenum and the additional annular plenum along the fluid flow path, such that the annular plenum, the one or more internal passages, and the additional annular plenum change the temperature of the process fluid flowing through the fluid flow path from the first temperature to the second temperature.

* * * * *

UNITED STATES PATENT AND TRADEMARK OFFICE
CERTIFICATE OF CORRECTION

| | | |
|---|---|---|
| PATENT NO. | : 11,585,456 B2 | Page 1 of 1 |
| APPLICATION NO. | : 16/241633 | |
| DATED | : February 21, 2023 | |
| INVENTOR(S) | : Thomas N. Gabriel | |

It is certified that error appears in the above-identified patent and that said Letters Patent is hereby corrected as shown below:

In the Specification

At Column 1, Line 59, "vale" should be -- valve --.

At Column 10, Line 46, "the the" should be -- the --.

Signed and Sealed this
Twenty-second Day of October, 2024

Katherine Kelly Vidal
*Director of the United States Patent and Trademark Office*